United States Patent
Mollenkopf

(10) Patent No.: US 7,626,497 B2
(45) Date of Patent: Dec. 1, 2009

(54) POWER LINE COMMUNICATION VEGETATION MANAGEMENT SYSTEM AND METHOD

(75) Inventor: James Douglas Mollenkopf, Fairfax, VA (US)

(73) Assignee: Current Technologies, LLC, Germantown, MD (US)

( * ) Notice: Subject to any disclaimer, the term of this patent is extended or adjusted under 35 U.S.C. 154(b) by 244 days.

(21) Appl. No.: 11/439,198

(22) Filed: May 24, 2006

(65) Prior Publication Data

US 2006/0271313 A1 Nov. 30, 2006

Related U.S. Application Data

(60) Provisional application No. 60/684,218, filed on May 25, 2005.

(51) Int. Cl.
*H04Q 1/30* (2006.01)
*G08B 1/08* (2006.01)
*H04M 11/04* (2006.01)

(52) U.S. Cl. .................. 340/538; 340/538.11; 702/59; 702/62

(58) Field of Classification Search ............... 340/538, 340/538.11–538.17, 310.11–310.18; 379/33; 324/500, 509; 455/404.1, 404.2, 14; 702/57–62; 333/12, 17.1–17.3
See application file for complete search history.

(56) References Cited

U.S. PATENT DOCUMENTS

| | | | |
|---|---|---|---|
| 4,156,280 A * | 5/1979 | Griess .......................... | 702/58 |
| 4,635,055 A | 1/1987 | Fernandes et al. | |
| 4,758,962 A | 7/1988 | Fernandes | |
| 5,006,846 A | 4/1991 | Granville et al. | |
| 5,210,518 A * | 5/1993 | Graham et al. ............... | 375/351 |
| 5,351,032 A * | 9/1994 | Latorre et al. ............... | 340/983 |
| 5,369,356 A | 11/1994 | Kinney et al. | |
| 5,414,400 A | 5/1995 | Gris et al. | |
| 5,455,776 A * | 10/1995 | Novosel ....................... | 702/59 |
| 5,498,956 A | 3/1996 | Kinney et al. | |
| 5,627,759 A * | 5/1997 | Bearden et al. ............... | 702/62 |
| 5,656,931 A * | 8/1997 | Lau et al. ..................... | 324/522 |
| 5,760,492 A | 6/1998 | Kanoi et al. | |

(Continued)

OTHER PUBLICATIONS

"Centralized Commercial Building Applications with the Lonworks® PLT-21 Power Line Transceiver", *Lonworks Engineering Bulletin*, Echelon, (Apr. 1997), 1-22.

*Primary Examiner*—Jennifer Mehmood
(74) *Attorney, Agent, or Firm*—Mel Barnes; Capital Legal Group, LLC

(57) ABSTRACT

A system for detecting the contact of vegetation or other objects with a power line conductor and that may provide an automated notification thereof is provided. In one embodiment, the system may assess one or more power line communication links to determine baseline performance parameters thereof and set associated communication thresholds. The system may also include sensors for measuring wind speed, power line voltages, and/or other data. In one embodiment, the measured data may continuously be time stamped and stored in memory. Sensed data such as voltage and/or wind speed is analyzed during the time of a degradation of a communication link. If there is a correlation in the occurrence of increased wind speed or decrease in voltage and one or more degradations of a communication channel, a notification may be transmitted. In addition, the system may determine location information of the contacting vegetation by determining that surrounding communication links were not degraded during the same time interval.

24 Claims, 3 Drawing Sheets

U.S. PATENT DOCUMENTS

| | | | |
|---|---|---|---|
| 5,777,545 A | 7/1998 | Patel | |
| 6,072,858 A * | 6/2000 | Bellin | 379/33 |
| 6,091,337 A * | 7/2000 | Arshad et al. | 340/662 |
| 6,151,330 A | 11/2000 | Liberman | |
| 6,208,945 B1 * | 3/2001 | Koda et al. | 702/60 |
| 6,675,071 B1 * | 1/2004 | Griffin et al. | 700/286 |
| 6,828,770 B1 | 12/2004 | McCauley et al. | |
| 6,917,888 B2 | 7/2005 | Logvinov et al. | |
| 6,927,672 B2 * | 8/2005 | Zalitzky et al. | 340/310.17 |
| 6,958,699 B1 * | 10/2005 | Karam | 340/650 |
| 7,069,117 B2 | 6/2006 | Wilson et al. | |
| 7,089,125 B2 | 8/2006 | Sonderegger | |
| 7,218,217 B2 * | 5/2007 | Adonailo et al. | 340/522 |
| 2001/0052843 A1 | 12/2001 | Wiesman et al. | |
| 2002/0000802 A1 | 1/2002 | Panto et al. | |
| 2003/0067725 A1 | 4/2003 | Horvath et al. | |
| 2003/0105608 A1 | 6/2003 | Hart | |
| 2003/0137388 A1 | 7/2003 | Meier et al. | |
| 2004/0021455 A1 | 2/2004 | Staats | |
| 2004/0056734 A1 * | 3/2004 | Davidow | 333/100 |
| 2004/0090312 A1 * | 5/2004 | Manis et al. | 340/310.02 |
| 2004/0160227 A1 | 8/2004 | Piesinger | |
| 2004/0183522 A1 | 9/2004 | Gunn et al. | |
| 2004/0212512 A1 | 10/2004 | Stewart | |
| 2005/0040809 A1 | 2/2005 | Uber, III et al. | |
| 2005/0083206 A1 | 4/2005 | Couch et al. | |
| 2005/0141682 A1 | 6/2005 | Wells | |
| 2006/0036795 A1 | 2/2006 | Leach | |
| 2006/0060007 A1 | 3/2006 | Mekhanoshin et al. | |
| 2006/0076946 A1 | 4/2006 | Shvach et al. | |
| 2006/0084419 A1 | 4/2006 | Rocamora et al. | |
| 2006/0087777 A1 | 4/2006 | Bruno | |
| 2006/0106554 A1 | 5/2006 | Borkowski et al. | |
| 2006/0187074 A1 | 8/2006 | O'Sullivan et al. | |
| 2006/0192672 A1 | 8/2006 | Gidge et al. | |
| 2006/0195229 A1 | 8/2006 | Bell et al. | |
| 2006/0217058 A1 | 9/2006 | Staszesky et al. | |
| 2006/0238364 A1 * | 10/2006 | Keefe et al. | 340/646 |
| 2006/0241880 A1 | 10/2006 | Forth et al. | |
| 2006/0271313 A1 | 11/2006 | Mollenlopf | |
| 2006/0284647 A1 | 12/2006 | Gunn et al. | |
| 2007/0136010 A1 | 6/2007 | Gunn et al. | |

* cited by examiner

POWER LINE COMMUNICATION VEGETATION MANAGEMENT SYSTEM AND METHOD

CROSS REFERENCE TO RELATED APPLICATIONS

This application claims priority to U.S. Provisional Patent Application No. 60/684,218 filed May 25, 2005, which is incorporated herein by reference in its entirety.

FIELD OF THE INVENTION

The present invention generally relates to enhanced power distribution services and more particularly, to a power line communication system that provides vegetation management and a method of using the same.

BACKGROUND OF THE INVENTION

Well-established power distribution systems exist throughout most of the United States, and other countries, which provide power to customers via power lines. With some modification, the infrastructure of the existing power distribution systems can be used to provide data communication in addition to power delivery, thereby forming a power line communication system (PLCS). In other words, existing power lines that already have been run to many homes and offices, can be used to carry data signals to and from the homes and offices. These data signals are communicated on and off the power lines at various points in the power line communication system, such as, for example, near homes, offices, Internet service providers, and the like.

Power system transformers are one obstacle to using power distribution lines for data communication. Transformers act as a low-pass filter, passing the low frequency signals (e.g., the 50 or 60 Hz) power signals and impeding the high frequency signals (e.g., frequencies typically used for data communication). As such, power line communication systems face the challenge of communicating the data signals around, or through, the distribution transformers. Power line communications systems typically have a bypass device at installed each transformer. Other PLCS may communicate to the customer premises via a wireless link instead of via the low voltage power lines.

Tree limbs and other vegetation may sometimes make contact with power line conductors such as medium and low voltage power lines. The contact may be due to a tree limb breaking from the trunk of the tree, the result of growth, the result of wind urging the limb against the conductor intermittently, or a combination thereof. Thus, there is a need for a power line communications system that can detect the contact (or near contact) of vegetation (or other object) with the power line conductor. This and other advantages may be provided by various embodiments of the present invention.

SUMMARY OF THE INVENTION

The present invention provides a system for detecting the contact of vegetation or other objects with a power line conductor and providing an automated notification thereof. The system may assess one or more power line communication links to determine baseline performance parameters thereof and set associated communication thresholds. The system may also include sensors for measuring wind speed, power line voltages, and/or other data. In one embodiment, the measured data may continuously be time stamped and stored in memory. Sensed data such as voltage and/or wind speed is analyzed during the time of a degradation of a communication link. If there is a correlation in the occurrence of increased wind speed or decrease in voltage and one or more degradations of a communication channel, a notification may be transmitted. In addition, the system may determine location information of the contacting vegetation by determining that surrounding communication links were not degraded during the same time interval.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION OF ILLUSTRATIVE EMBODIMENTS

In the following description, for purposes of explanation and not limitation, specific details are set forth, such as particular networks, communication systems, computers, terminals, devices, components, techniques, data and network protocols, software products and systems, operating systems, development interfaces, PLCS, hardware, etc. in order to provide a thorough understanding of the present invention.

However, it will be apparent to one skilled in the art that the present invention may be practiced in other embodiments that depart from these specific details. Detailed descriptions of well-known networks, communication systems, computers, PLCS, terminals, devices, components, techniques, data and network protocols, software products and systems, operating systems, PLCS, development interfaces, and hardware are omitted so as not to obscure the description of the present invention.

Figure 1:
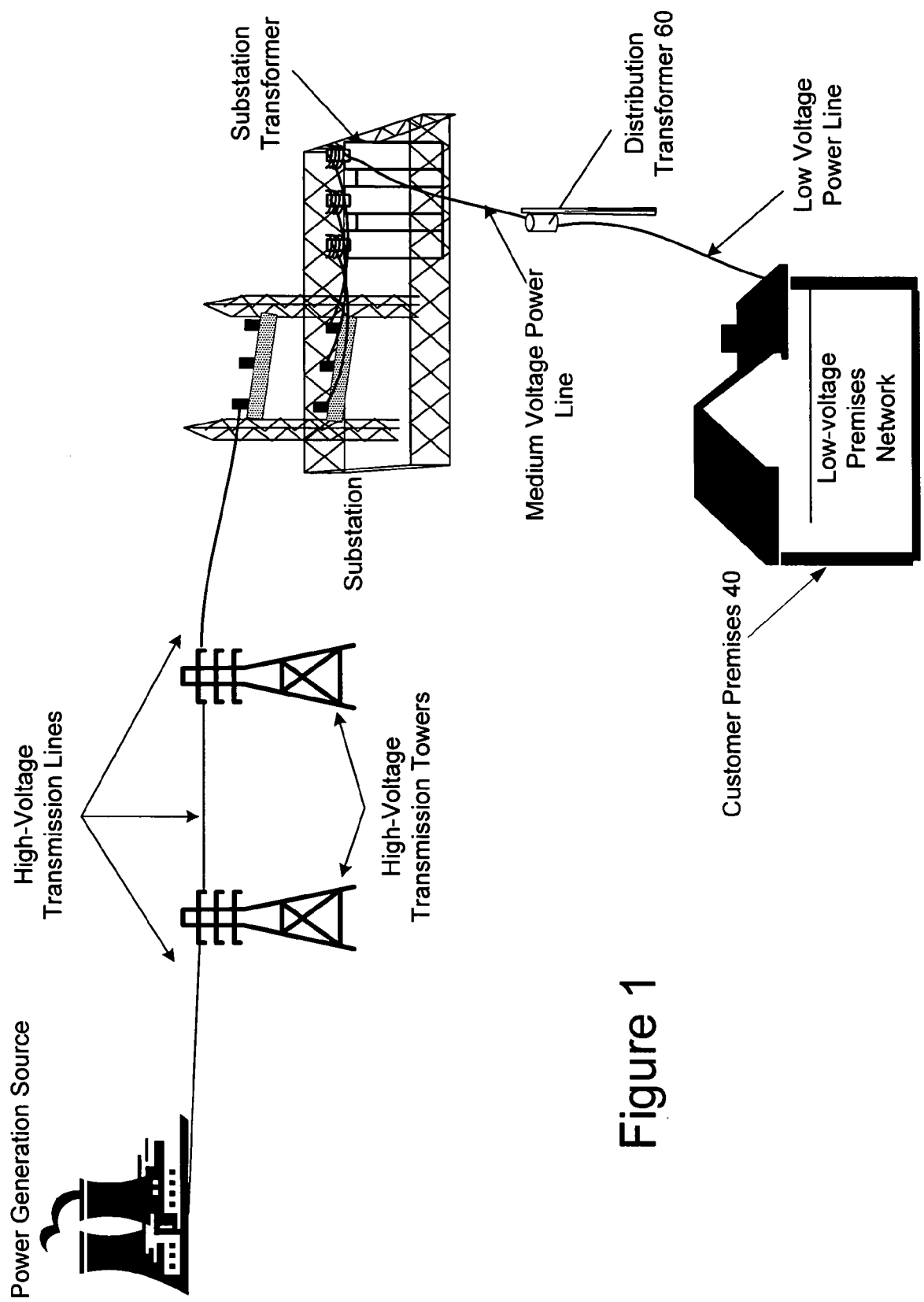
FIG. 1 is a diagram of an exemplary power distribution system with which the present invention may be employed.

As shown in FIG. 1, power distribution systems typically include components for power generation, power transmission, and power delivery. A transmission substation typically is used to increase the voltage from the power generation source to high voltage (HV) levels for long distance transmission on HV transmission lines to a substation. Typical voltages found on HV transmission lines range from 69 kilovolts (kV) to in excess of 800 kV.

In addition to HV transmission lines, power distribution systems include medium voltage (MV) power lines and low voltage (LV) power lines. As discussed, MV typically ranges from about 1000 V to about 100 kV and LV typically ranges from about 100 V to about 800 V. Transformers are used to convert between the respective voltage portions, e.g., between the HV section and the MV section and between the MV section and the LV section. Transformers have a primary side for connection to a first voltage (e.g., the MV section) and a secondary side for outputting another (usually lower) voltage (e.g., the LV section). Such transformers are often referred to as distribution transformers or a step down transformers, because they "step down" the voltage to some lower voltage. Transformers, therefore, provide voltage conversion for the power distribution system. Thus, power is carried from substation transformer to a distribution transformer over one or more MV power lines. Power is carried from the distribution transformer to the customer premises via one or more LV power lines.

In addition, a distribution transformer may function to distribute one, two, three, or more phase voltages to the customer premises, depending upon the demands of the user. In the United States, for example, these local distribution transformers typically feed anywhere from one to ten homes, depending upon the concentration of the customer premises in a particular area. Distribution transformers may be pole-top transformers located on a utility pole, pad-mounted transformers located on the ground, or transformers located under ground level.

Power Line Communication System

Figure 2:
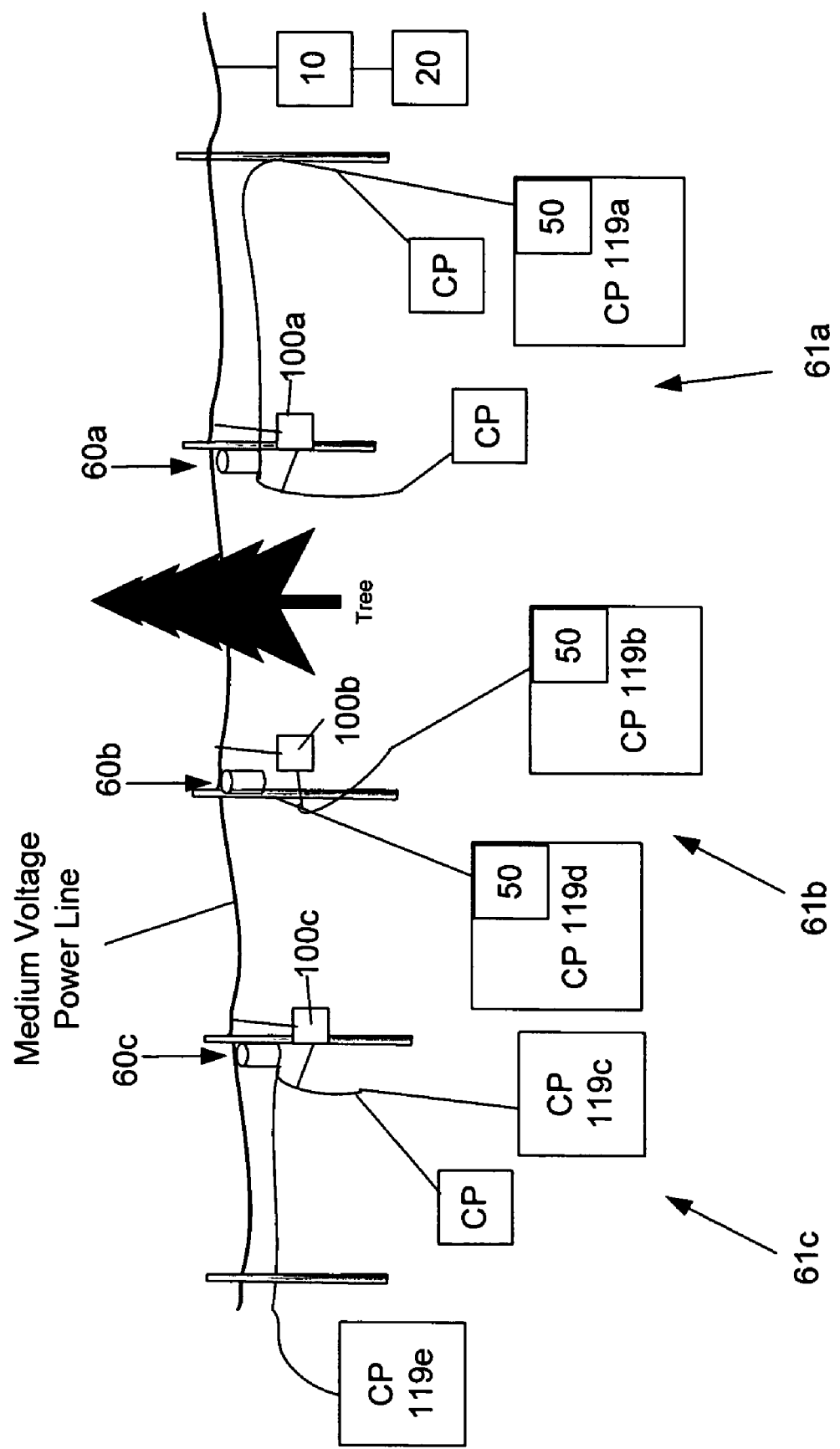
FIG. 2 is a diagram of a power line communications system in accordance with an example embodiment of the present invention.

One example of a portion of a conventional PLCS is shown in FIG. 2. In this example, three bypass devices (BD) 100a, 100c, and 100b are used to communicate broadband internet and other data signals around the distribution transformers 60 that would otherwise filter such data signals, preventing them from passing through the transformer 60 or significantly degrading them. Thus, the BD 100 is the gateway between the LV power line subnet 61 (i.e., the LV power line connected to the distribution transformer and the devices that are communicatively coupled to the LV power lines) and the MV power line and communicates signals to and from user devices at the customer premises (CP) via the low voltage subnet 61.

In this embodiment, the BD 100 provides communication services for the user, which may include security management, routing of Internet Protocol (IP) packets, filtering data, access control, service level monitoring, signal processing and modulation/demodulation of signals transmitted over the power lines.

This example portion of a PLCS also includes a backhaul point 10. The backhaul point 10 is an interface and gateway between a portion of a PLCS (e.g., an MV run) and a traditional non-power line telecommunications network. One or more backhaul points (BP) 10 are communicatively coupled to an aggregation point (AP) 20 that in many embodiments may be at (e.g., co-located with), or connected to, the point of presence to the Internet. The BP 10 may be connected to the AP 20 using any available mechanism, including fiber optic conductors, T-carrier, Synchronous Optical Network (SONET), or wireless techniques well known to those skilled in the art. Thus, the BP 10 may include a transceiver suited for communicating through the communication medium.

The PLCS also may include a power line server (PLS) (not shown) that is a computer system with memory for storing a database of information about the PLCS and includes a network element manager (NEM) that monitors and controls the PLCS. The PLS allows network operations personnel to provision users and network equipment, manage customer data, and monitor system status, performance and usage. The PLS may reside at a remote network operations center (NOC), and/or at a PLCS Point of Presence (POP), to oversee a group of communication devices via the Internet. The PLS may provide an Internet identity to the network devices by assigning the devices (e.g., user devices, BDs 100, (e.g., the LV modems and MV modems of BDs), BPs 10, and AP 20) IP addresses and storing the IP addresses and other device identifying information (e.g., the device's location, address, serial number, etc.) in its memory. In addition, the PLS may approve or deny user devices' authorization requests, command status reports, statistics and measurements from the BDs, and BPs, and provide application software upgrades to the communication devices (e.g., BDs, BPs, and other devices). The PLS, by collecting electric power distribution information and interfacing with utilities' back-end computer systems may provide enhanced power distribution services such as automated meter reading, outage detection, restoration detection, load balancing, distribution automation, Volt/Volt-Amp Reactance (Volt/VAr) management, and other similar functions—and in this example embodiment, vegetation management. The PLS also may be connected to one or more APs and/or core routers directly or through the Internet and therefore can communicate with any of the BDs, user devices, and BPs through the respective AP and/or core router.

The PLCS may further include indoor low voltage repeaters and outdoor low voltage repeaters (not shown). Indoor low voltage repeaters may be plugged into a wall socket inside the customer premises. Outdoor low voltage repeaters may be coupled to the external low voltage power line conductors extending from the transformer and therefore, be located between the customer premises and the BD 100. Both the indoor low voltage repeaters and outdoor low voltage repeaters repeat data on the low voltage power line to extend the communication range of the BD 100 and power line modem.

At the user end of the PLCS of this example system, data flow originates from a user device in the customer premises 119, which provides the data to a power line modem (PLM) 50, which is well-known in the art.

The user device connected to the PLM 50 may be any device capable of supplying data for transmission (or for receiving such data) including, but not limited to a computer, a telephone, a telephone answering machine, a fax, a digital cable box (e.g., for processing digital audio and video, which may then be supplied to a conventional television and for transmitting requests for video programming), a video game, a stereo, a videophone, a television (which may be a digital television), a video recording device (which may be a digital video recorder), a home network device, a utility meter, or other device. The PLM 50 transmits the data received from the user device through the LV power lines to a BD 100 and provides data received from the LV power line to the user device. The PLM 50 may also be integrated with the user device, which may be a computer. In addition, the functions of the PLM may be integrated into a smart utility meter such as a gas meter, electric meter, water meter, or other utility meter to thereby provide automated meter reading (AMR).

The BD 100 typically receives data from the user devices coupled to its LV power line subnet and then transmits the data to (and receives the data from) the backhaul point 10, which, in turn, transmits the data to (and receives the data from) the AP 20. The AP 20 then transmits the data to (and receives the data from) the appropriate destination (perhaps via a core router), which may be a network destination (such as an Internet address) in which case the packets are transmitted to, and pass through, numerous routers (herein routers are meant to include both network routers and switches) in order to arrive at the desired destination. A more detailed description of an example PLCS is provided in U.S. patent application Ser. No. 10/641,689 filed Aug. 14, 2003, Attorney Docket No. CRNT-0178, entitled "Power Line Communication System and Method of Operating the Same," which is hereby incorporated by reference in its entirety. The present invention may be used with networks as described in the above patent application or others. Thus, the invention is not limited to a particular PLCS, PLCS architecture, or topology.

Referring to FIG. 2, this conventional PLCS includes a BD 100 at each distribution transformers 60a-c to service the user devices coupled to the respective LV power line subnet. Thus, BD 100a is coupled to backhaul point 10 via the MV power line and also coupled to LV power line subnet 61a to provide communications to the user devices coupled thereto. In this example, LV power line subnet 61a includes the LV power lines coupled to distribution transformer 60a, which may be connected to between one and ten (and sometimes more) customer premises CP. One or more of the customer premises 119 may include one or more power line modems 50 and associated user devices that are connected to the internal power lines such as, for example, at CP 119a.

Similarly, BD 100b is coupled to backhaul point 10 via the MV power line and also coupled to LV power line subnet 61b to provide communications to the user devices coupled thereto. In this example, LV power line subnet 61b includes the LV power lines coupled to distribution transformer 60b. One or more of the customer premises receiving power via LV power line subnet 61b may include one or more PLMs 50 and the associated user devices connected thereto such as, for example, at CP 119b and 119d. As will be evident to those skilled in the art, BD 100c similarly provides communications services for devices at CP 119c and 119e.

Figure 3:
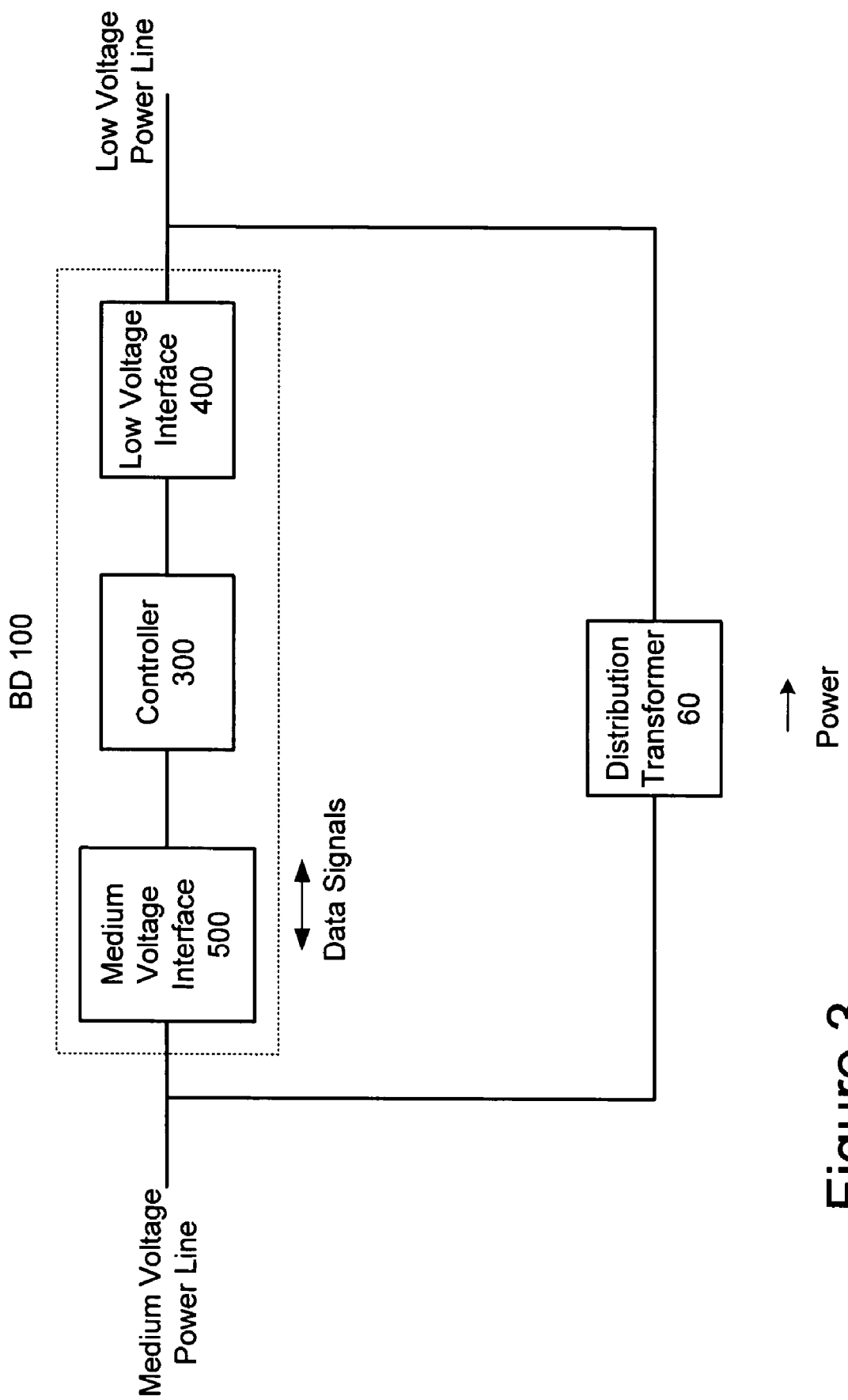
FIG. 3 is a diagram of an example embodiment of a power line communications device according to one example embodiment of the present invention.

The BD 100 described herein, which is an example embodiment of the present invention, provides bi-directional communications and includes the functional block diagrams shown in FIG. 3. In particular, this embodiment of the BD 100 includes a MV power line interface (MVI) 500, a controller 300, and a LV power line interface (LVI) 400. Both the MVI 500 and LVI may include a modem for transmitting and receiving data. Further, both the MVI 500 and LVI may include an adaptive and/or dynamic transmitter (e.g., forming part of the modem or connected thereto) to transmit signals at various power levels as determined by the controller 300, which may change the output power in response to a command from the PLS or automatically due to changes in line impedance. The BD 100 is controlled by a programmable processor and associated peripheral circuitry, which form part of the controller 300. The controller 300 includes memory that stores, among other things, routing information and program code, which controls the operation of the processor.

The BP 10 also may include a MVI 500, a backhaul link interface, and a controller 300. The BDs 100 and/or the BP 10 may also include one or more sensors such as a wind speed sensor that detects wind speed. In addition, the BDs 100 and/or the BP 10 may include other sensors such as an analog to digital converter that is coupled to the electrical power distribution system (the MV power line conductor and/or the LV power line conductor) to measure the voltage of the selected conductor(s). The data for both wind speed and voltage measurement may also be time stamped when stored in memory and may also be transmitted to the PLS for storage.

The present invention may be most suitable for managing vegetation around power distribution systems that include un-insulated power line conductors such as overhead medium voltage power lines. This is because, in one example embodiment, the system utilizes a degradation or change in a communications link that may be caused by a tree or other vegetation contacting an un-insulated power line conductor that forms part of the link. Additionally, contact by the vegetation may also cause a change in the voltage (e.g., a dip in which the voltage drops (perhaps below a threshold value) and returns to substantially the original voltage (perhaps above a threshold value)) on the un-insulated power line conductor.

In one example PLCS, communications from the BP 10 to the BDs 100 may be point to multi-point. Communications between the BP 10 and BDs 100 may employ time division multiplexing and/or frequency division multiplexing.

After initialization of the system, the PLS, BP 10 and/or BDs 100 may perform a communication link assessment, which may determine link quality and may include minimum and/or normal communication parameter data. In other words, the system may determine a baseline from which to detect a degradation in communications of the link. Thus, for the link between the BP 10 and BD 100a, BP 10 and/or BD 100a may determine performance parameters for the upstream link (for communications to the BP 10 from BD 100a) and the downstream link (for communications from the BP 10 to BD 100a). The performance parameters may include a bit error rate, bandwidth or data rate (e.g., bits per second), and/or other performance data. In addition, performance parameter data for the upstream and downstream links for the link between the BP 10 and BD 100b and the link between BP 10 and BD 100c may also be collected. The performance parameter data may be stored in the BP 10, the PLS, and/or the BD 100a.

Periodically, or while providing communications of user data, the BP 10 and/or BD 100 may determine a degradation in the communication link, which may include detecting a bit error rate (BER) above a predetermined threshold that may be related to (e.g., a percentage over) the average BER measured during the communication link assessment. Alternately, or in addition, detection of a degradation of the communication link may include detecting a decrease in bandwidth (data rate) below a predetermined threshold, which may be related to (e.g., a percentage below) the average bandwidth (data rate) measured during the communication link assessment. The time of the communication link degradation and the associated degraded performance data may be stored in memory of the BP 10 or BD 100 and/or also transmitted to the PLS.

After, or at determination of, a degradation in the communication link, the PLS, BD 100, and/or BP 10 may correlate the timing of the link degradation with sensor data. For example, the PLS, BD 100, and/or BP 10 may process data to determine the wind speed at the receiving (or transmitting) BP 10 or BD 100 during one, two, three or more link degradations. If the wind speed during one or more of the link degradations is above a predetermined threshold (e.g., 5, 7, 10, 15, or 20 miles per hour), which may be stored in memory of the PLS, BD 100, and/or BP 10, it may be possible to deduce that a tree or other vegetation is being urged by the wind into contact with a power line conductor that forms part of the communication link. In addition, this conclusion may be further bolstered if, at other time periods when a link degradation is not experienced, the wind speed is below the predetermined threshold.

The PLS, BD 100, and/or BP 10 may also compare the timing of the communication link degradation with a change in other sensed data. For example, the PLS, BD 100, and/or BP 10 may process data to determine voltage measurement data (of the MV power line or LV power line) of the receiving or transmitting BD 100 and/or BP 10 during one, two, three or more link degradations. If the voltage(s) is (are) below a predetermined threshold (e.g., 5, 10, 15, or 20 percent below the nominal voltage measurement), which may be stored in memory of the PLS, BD 100, and/or BP 10, during one or more link degradations, it may be possible to deduce that a tree or other vegetation is contacting a power line conductor that forms part of the communication link. In addition, this conclusion may be further bolstered if, at other time periods when a link degradation is not experienced, the voltage is above the predetermined threshold.

Furthermore, this conclusion may be even further bolstered if the wind speed is above the predetermined threshold and the voltage is below its predetermined threshold during a link degradation. Finally, contact of the vegetation or other object with the power line may have a signature that may be recognizable by the controller of the BD 100 or BP 10 or the PLS. For example, if wind is urging a tree limb into contact with a power line conductor, the length of time that the tree contacts the conductor (and the associated time of degradation of the communication link and drop in the measured voltage) typically may exceed a minimum time duration and/or be less than a maximum time duration. Thus, the duration or other characteristic of a degradation in the communication link and/or a drop in voltage measurement may be compared to minimum and maximum durations or other parameters to detect vegetation contacting a power line. Further, determining whether the parameter of the communication link satisfies predetermined conditions may comprise, among other things, one or more of determining whether a data rate of the communication link is below a threshold value or determining whether an error rate of the communication link is above a threshold value.

Upon detecting vegetation contacting a power line conductor (e.g., by determining a correlation between a degradation in a communication link and one or more types of sensed data), the system may also determine location information for the vegetation that may be contacting the power line. For example, referring to FIG. 2, if the communication link between BD 100a and BP 10 does not experience a degradation when the link between BD 100b and BP 10 does experience a degradation, the vegetation contacting the power line conductor likely may be located between transformers 60a and 60b. The location of the transformers may be stored in memory as well (e.g., at the PLS). The location information may be transmitted to the PLS (if not determined by the PLS). In addition, a notification (such as an electronic notification) that includes information (e.g., longitude and latitude or pole number(s)) may be transmitted to the electric utility company to allow it to coordinate a utility crew to trim or remove the vegetation or other object contacting the conductor. Depending on the embodiment, the steps for performing the embodiments may be performed by different components (elements) of the PLCS. For example, the measurements may be performed by the BDs while the processing (e.g., comparing the measured data with threshold data) may be performed by a BP or the PLS (which receives the data via communication from the measuring device).

As is known in the art, MV power line conductors often run in parallel. In some PLCSs, the BD 100 may not be electrically coupled to the same MV power line conductor as the BP 10. This is because the high frequency data signals may couple through the air and across power line conductors. Thus, the communications link (through which a degradation may be detected) may be comprised of one, two, three, or more power line conductors (including the neutral conductor).

Furthermore, in an alternate embodiment, the determination that an object such as vegetation is in contact (or has contacted) the power line conductor may be determined by detecting a voltage dip (e.g., the voltage drops below a predetermined threshold), which conclusion may be bolstered if the wind speed is above the predetermined threshold during (or slightly before) the voltage dip. Additionally, or alternately, this conclusion may further be bolstered is there is a degradation of the communication during the voltage dip.

Finally, the type of data signals communicated via the MV and LV power lines be any suitable type of data signal. The type of signal modulation used can be any suitable signal modulation used in communications (Code Division Multiple Access (CDMA), Time Division Multiple Access (TDMA), Frequency Division Multiplex (FDM), Orthogonal Frequency Division Multiplex (OFDM), and the like). OFDM may be used for one or both of the LV and MV power lines, including HomePlug 1.0 or AV data signals. A modulation scheme producing a wideband signal such as CDMA or OFDM that is relatively flat in the spectral domain may be used to reduce radiated interference to other systems while still delivering high data communication rates.

In addition, instead of using OFDM signals on the MV power line or LV power line, an alternate embodiment of a PLCS system may use ultra wideband signals to provide communications over the MV and/or LV power lines.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

What is claimed is:

1. A method, implemented at least in part by a computer system, of detecting contact of an object with a power line that does not sever the power line, comprising:
    measuring a voltage of the power line;
    detecting a voltage dip of the voltage of the power line that comprises a voltage decrease below a threshold value for a predetermined time followed by a voltage increase to a voltage above the threshold value; and
    determining whether the voltage dip of the power line substantially matches a signature of an object contacting the power line without severing the power line.

2. The method of claim 1, further comprising:
    if the voltage dip substantially matches a signature of an object contacting the power line, transmitting a notification; and
    if the voltage dip does not substantially match a signature of an object contacting the power line, not transmitting the notification.

3. The method of claim 2, wherein the transmitting comprises transmitting the notification over the power line of which the voltage is measured.

4. The method of claim 2, wherein the transmitting comprises transmitting the notification over a power line.

5. The method of claim 1, further comprising: measuring a wind speed; and
    determining whether the measured wind speed is above a threshold value during the voltage dip.

6. The method of claim 1, wherein the power line comprises an overhead medium voltage power line carrying a voltage greater than one thousand volts.

7. The method of claim 1, further comprising:
    establishing a power line communication link over the power line; and
    detecting a degradation in the power line communication link during the detected voltage dip.

8. The method of claim 1, wherein the measuring is performed by a device having a first port for communicating over a medium voltage power line carrying a voltage greater than one thousand volts and a user port for communicating with a user device.

9. The method of claim 1, further comprising communicating broadband internet data for one or more user devices via the power line.

10. The method of claim 1, further comprising transmitting information for determining location information of the object contacting the power line.

11. A method, implemented at least in part by a computer system, of detecting contact of an object with a power line that does not sever the power line, comprising:
measuring a voltage of the power line;
detecting a voltage dip in the voltage of the power line that comprises a voltage decrease below a threshold value for a predetermined time followed by a voltage increase to a voltage above the threshold value; and
determining location information of the object contacting the power line.

12. The method of claim 11, further comprising: if the voltage change substantially matches a signature of an object contacting the power line, transmitting a notification; and if the voltage change does not substantially match a signature of an object contacting the power line, not transmitting the notification.

13. The method of claim 12, wherein the transmitting comprises transmitting the notification over the power line of which the voltage is measured.

14. The method of claim 12, wherein the transmitting comprises transmitting the notification over a power line.

15. The method of claim 11, further comprising:
measuring a wind speed; and
determining whether the measured wind speed is above a threshold value during the voltage dip.

16. The method of claim 11, wherein the power line comprises an overhead medium voltage power line carrying a voltage greater than one thousand volts.

17. The method of claim 11, further comprising:
establishing a power line communication link over the power line; and
detecting a degradation in the power line communication link during the detected voltage change.

18. The method of claim 11, wherein the detecting is performed by a device having a first port for communicating over a medium voltage power line carrying a voltage greater than one thousand volts and a user port for communicating with a user device.

19. The method of claim 11, further comprising communicating broadband internet data for one or more user devices via the power line.

20. The method of claim 11, further comprising providing a notification of the object contacting the power line.

21. The method of claim 11, wherein the determining is performed by a first device that is remote from a second device that performs the measuring.

22. The method of claim 11, further comprising transmitting the location information of the object contacting the power line.

23. A method, implemented at least in part by a computer system, of detecting contact of an object with a power line that does not sever the power line, comprising:
establishing a power line communication link over the power line;
detecting a degradation in the power line communication link;
detecting a voltage dip of a voltage of the power line during said degradation that comprises a voltage decrease below a threshold value for a predetermined time followed by a voltage increase to a voltage above the threshold value; and
transmitting a notification.

24. The method of claim 23, further comprising:
measuring a wind speed during said degradation; and
determining whether the measured wind speed is above a threshold value.

* * * * *